United States Patent
Palomares Rentero

(10) Patent No.: US 10,107,262 B2
(45) Date of Patent: Oct. 23, 2018

(54) WIND TURBINE ROTATIONAL SYSTEM

(71) Applicant: ALSTOM RENEWABLE TECHNOLOGIES, Grenoble (FR)

(72) Inventor: Pedro Palomares Rentero, Barcelona (ES)

(73) Assignee: GE RENEWABLE TECHNOLOGIES WIND B.V., Breda (NL)

(*) Notice: Subject to any disclaimer, the term of this patent is extended or adjusted under 35 U.S.C. 154(b) by 304 days.

(21) Appl. No.: 14/758,789

(22) PCT Filed: Jan. 14, 2014

(86) PCT No.: PCT/EP2014/050587
§ 371 (c)(1),
(2) Date: Jun. 30, 2015

(87) PCT Pub. No.: WO2014/108557
PCT Pub. Date: Jul. 17, 2014

(65) Prior Publication Data
US 2015/0345470 A1    Dec. 3, 2015

Related U.S. Application Data

(60) Provisional application No. 61/785,040, filed on Mar. 14, 2013.

(30) Foreign Application Priority Data

Jan. 14, 2013 (EP) .................... 13382008

(51) Int. Cl.
F03D 7/04 (2006.01)
G05B 15/02 (2006.01)
F03D 7/02 (2006.01)

(52) U.S. Cl.
CPC ........... *F03D 7/042* (2013.01); *F03D 7/0204* (2013.01); *F03D 7/0224* (2013.01); *F03D 7/047* (2013.01);
(Continued)

(58) Field of Classification Search
CPC ........ F03D 7/042; F03D 7/0224; F03D 7/047; F03D 7/0204; G05B 15/02; Y02E 10/723; F05B 2270/111; F05B 2240/40
See application file for complete search history.

(56) References Cited

U.S. PATENT DOCUMENTS 6,137,187 A * 10/2000 Mikhail ................ F03D 7/0224
290/44
7,944,070 B2    5/2011 Rosenvard et al.
(Continued)

FOREIGN PATENT DOCUMENTS

EP     2 495 435       9/2012
WO    WO 2012/000504  1/2012

OTHER PUBLICATIONS

Boukhezzar, B.; Lupu, L.; Siguerdidjane, H. and Hand, M., "Multivariable Control Strategy for Variable Speed, Variable Pitch Wind Turbines", Apr. 30, 2006, Renewable Energy, 32, (2007) 1273-1287.*

(Continued)

*Primary Examiner* — Mohammad Ali
*Assistant Examiner* — Kelvin Booker
(74) *Attorney, Agent, or Firm* — Dority & Manning, P.A.

(57) ABSTRACT

Method of operating a wind turbine rotational system having a plurality of drives and a central control system (CCS), each drive having a motor and an electronic converter. The CCS sends speed and torque setpoints to the electronic converters, and the electronic converters drive the motors in accordance with said setpoints. The method comprises designat- (Continued)

ing one of the drives as master drive and the other drives as slave drives. The method also comprises the CCS determining a master speed setpoint and a master torque setpoint, and sending said setpoints to the master drive. The method further comprises the CCS obtaining the real torque and speed of the motor of the master drive and sending a slave speed setpoint and a slave torque setpoint to each slave drive, said slave speed setpoint based on the master speed setpoint and said slave torque setpoint equal to the obtained real torque of the master drive.

8 Claims, 2 Drawing Sheets

(52) U.S. Cl.
CPC .......... *G05B 15/02* (2013.01); *F05B 2240/40* (2013.01); *F05B 2270/111* (2013.01); *Y02E 10/723* (2013.01)

(56) References Cited

U.S. PATENT DOCUMENTS

| | | | | |
|---|---|---|---|---|
| 8,749,089 B2* | 6/2014 | Arinaga | ................ | F03D 7/0224 290/44 |
| 9,790,916 B2* | 10/2017 | Valero Lafuente | ..... | F03D 80/50 |
| 9,816,383 B2* | 11/2017 | Birkestrand | ............. | F01D 7/00 |
| 9,816,384 B2* | 11/2017 | Birkestrand | ............. | F01D 7/00 |
| 2002/0105189 A1* | 8/2002 | Mikhail | ................ | F03D 7/0224 290/44 |
| 2005/0012339 A1* | 1/2005 | Mikhail | ................ | F03D 7/0224 290/44 |
| 2007/0205602 A1* | 9/2007 | Willey | ................. | F03D 7/0224 290/44 |
| 2008/0150292 A1* | 6/2008 | Fedor | ........................ | F03D 1/04 290/55 |
| 2010/0034658 A1* | 2/2010 | Numajiri | ................. | F03D 13/10 416/204 R |
| 2010/0080683 A1* | 4/2010 | Presz, Jr. | ................... | F03D 1/04 415/4.3 |
| 2010/0138060 A1* | 6/2010 | Gao | ...................... | F03D 7/0204 700/287 |
| 2010/0144483 A1* | 6/2010 | Aiyakkannu | ............ | F03D 1/00 475/225 |
| 2010/0301607 A1* | 12/2010 | Morimoto | ............ | F03D 1/0658 290/44 |
| 2010/0314875 A1* | 12/2010 | Grant | .................... | F03D 7/0212 290/44 |
| 2011/0215576 A1* | 9/2011 | Minami | ................ | F03D 7/0204 290/44 |
| 2011/0318178 A1 | 12/2011 | Andersen | | |
| 2012/0112458 A1* | 5/2012 | Numajiri | ............... | F03D 7/0204 290/44 |
| 2012/0242085 A1* | 9/2012 | Garfinkel | ............. | F03D 7/0204 290/44 |
| 2012/0266708 A1* | 10/2012 | Valero Lafuente | ..... | F03D 1/003 74/411.5 |
| 2013/0038065 A1* | 2/2013 | Versteeg | ................... | H02K 1/20 290/53 |
| 2013/0052013 A1* | 2/2013 | Eckart | ................... | F03D 7/0272 416/9 |
| 2013/0088009 A1* | 4/2013 | Cousineau | ............ | F03D 7/0204 290/44 |
| 2013/0099494 A1* | 4/2013 | Numajiri | ............... | F03D 7/0212 290/44 |
| 2013/0106109 A1* | 5/2013 | Richert | ................. | F03D 7/0208 290/44 |
| 2013/0115043 A1* | 5/2013 | Rosenvard | ............ | F03D 7/0204 415/1 |
| 2013/0200618 A1* | 8/2013 | Prindle | ................ | H02K 7/1838 290/44 |
| 2013/0300115 A1* | 11/2013 | Seem | ........................ | H02P 9/04 290/44 |
| 2014/0003943 A1* | 1/2014 | Valero Lafuente | ..... | F03D 1/003 416/146 R |
| 2014/0217729 A1* | 8/2014 | Zaib | ........................ | F03D 7/048 290/44 |
| 2014/0361540 A1* | 12/2014 | Knight | .................... | F03D 80/88 290/44 |
| 2015/0337806 A1* | 11/2015 | Damgaard | .............. | F03D 7/047 700/287 |
| 2016/0003222 A1* | 1/2016 | Palomares Rentero | ...................... | F03D 7/0224 416/1 |
| 2018/0135598 A1* | 5/2018 | Rosenvard | .............. | F03D 17/00 |

OTHER PUBLICATIONS

Singh, C. and Poddar, K., "Implementation of a VI-Based Multi-Axis Motion Control System for Automated Test and Measurement Applications", Nov. 19-21, 2008, TENCON 2008.*

Yang, J. and Fu, X., "Single-Axis Motion Control of Wind Turbine", 2013, Proceedings of 2013 IEEE International Conference on Mechatronics and Automation.*

Van Zijl, A., "Master-Slave Motor Control", Aug. 1997, Master of Science Thesis, department of Electrical Engineering of the Eindhoven University of Technology.*

International Search Report for PCT/EP2014/050587, dated Mar. 12, 2014, 9 pgs.

* cited by examiner

WIND TURBINE ROTATIONAL SYSTEM

This application claims the benefit of European Patent Application EP 13 382 008.4 filed on Jan. 14, 2013 and U.S. Provisional Patent Application Ser. No. US 61/785,040 filed on Mar. 14, 2013.

The present invention relates to a method of operating a wind turbine rotational system having a plurality of drives and a central control system, each drive comprising a motor, an electronic converter for driving the motor and an actuator operatively connected with the motor.

The present invention also relates to a wind turbine rotational system suitable for performing such a method.

BACKGROUND ART

Modern wind turbines are commonly used to supply electricity into the electrical grid. Wind turbines of this kind generally comprise a tower and a rotor arranged on the tower. The rotor, which typically comprises a hub and a plurality of blades, is set into rotation under the influence of the wind on the blades. Said rotation generates a torque that is normally transmitted through a rotor shaft, either directly or through the use of a gearbox, to a generator. This way, the generator produces electricity which is supplied into the electrical grid.

A wind turbine may comprise rotational systems (e.g. yaw systems or pitch systems) having several motors working together to cause rotation of the system. A yaw system is normally used for orienting the rotor of the wind turbine in the prevailing wind direction. Normally, when the rotor is aligned to the wind direction, the yaw system maintains the position of the rotor. When the rotor is misaligned from the wind direction the yaw system rotates the nacelle to reach an appropriate alignment with the wind.

A yaw system normally performs this rotation of the nacelle by means of a plurality of electric motors with suitable gearboxes for driving gears (pinions) meshing with an annular gear. This annular gear may be attached to the nacelle or to the wind turbine tower. The nacelle can thus be rotated around the tower's longitudinal axis in or out of the wind direction.

Pitch systems are employed for adapting the position of a wind turbine blade to varying wind conditions by rotating the blade along its longitudinal axis. Similarly to the yaw systems explained before, a pitch system of a single blade may comprise a plurality of electric motors for driving actuating gears (pinions) which mesh with an annular gear to set the corresponding blade into rotation. To this end, the annular gear may be provided on the blade and the electric motors and actuators may be mounted on the hub. Alternatively, the annular gear may be provided on the hub and the electric motors and actuators may be mounted on the blade.

An aspect of providing a plurality of motors for a wind turbine rotational system is that local wear on the annular gear may be reduced. Furthermore, when a plurality of motors is used, the motors may be less powerful than if a single motor were used. A consequence of this is that the annular gear may be thinner. Another aspect is that redundancy may be also provided, so that even if one or more motors fail, the wind turbine rotational system can still be operated.

Different approaches for driving the plurality of motors are known. For example, some applications use a common single driver (e.g. electronic converter) for driving all the motors in accordance with common setpoints. An advantage of this approach may be that only one driver is required, which makes the control of the motors rather cheap. However, if this single driver fails, the whole rotational system may become inoperative. Moreover, sharing of loads between the motors may be significantly unbalanced (some could be working as motor and others as generator), which may cause some components of the rotational system to suffer stress, fatigue and/or mechanical wear.

Some other applications use multiple drivers/motors working in parallel without synchronization. This approach is based on having several motors and a driver (e.g. electronic converter) for each motor, the motors being driven (each motor by its dedicated driver) in accordance with setpoints common to all the drivers. Since each motor is driven by its dedicated driver, if one of these drivers fails, only its related motor may become inoperative and not the whole system. The application of this approach is simple and uses relatively cheap components, which makes the control of the motors rather cheap. However, sharing of loads between drivers/motors may be significantly unbalanced (some could be working as motor and others as generator), which may cause some components of the rotational system to suffer stress, fatigue and/or mechanical wear.

Another approach is disclosed by the U.S. Pat. No. 7,944,070B2, which describes a yaw system including a plurality of motors, a plurality of controllers, one controller for each of the motors, and a yaw system controller. Each controller is configured to control the respective motor and coupled to at least one other controller to transmit operation information thereto. The yaw system controller is configured to transmit control information to at least one controller of the plurality of controllers. At least one of the controllers is configured to control the respective motor based on at least one of the control information and the received operation information from the at least one other controller. Some aspects of this system, which is based on communication between controllers, may be that a faster response of the yaw system according to a change of wind conditions can be provided, and that a torque applied on the nacelle can be more equally shared among the plurality of motors.

However, functionalities requiring significant processing capabilities are attributed to the controllers. Moreover, since these functionalities are implemented individually by each controller to achieve desired behaviors of the overall system, a good coordination between said functionalities may be required. Therefore, this system may require complex and expensive controllers with complex and expensive implementations of individual functionalities.

SUMMARY OF THE INVENTION

There still exists a need for new wind turbine rotational systems and methods of operating such systems that at least partially resolve some of the above mentioned problems. It is an object of the present invention to fulfil such a need.

In a first aspect, the present invention provides a method of operating a wind turbine rotational system having a plurality of drives and a central control system, each drive comprising a motor, an electronic converter for driving the motor and an actuator operatively connected with the motor. The central control system is adapted to send speed setpoints and torque setpoints to the electronic converters and the electronic converters are adapted to drive the motors in accordance with the received setpoints. Speed setpoints are defined as speed values the rotational system is expected to achieve. Torque setpoints are defined as maximum torque values which cannot be surpassed as they relate to mechanical constraints (torque setpoints are not torque values to track).

The method comprises designating one of the drives as a master drive and designating the other drives as slave drives. The method also comprises the central control system determining a master speed setpoint and a master torque setpoint, and the central control system sending the master speed setpoint and the master torque setpoint to the master drive. The method also comprises the central control system obtaining, from the master drive, values representing the real torque and speed of the motor of the master drive. The method further comprises the central control system sending a slave speed setpoint and a slave torque setpoint to each of the slave drives, said slave speed setpoint being based on the master speed setpoint, and said slave torque setpoint being equal to the value representing the real torque of the master drive.

Each actuator operatively connected with the corresponding motor may be a suitable gearbox for driving a gear (pinion). All these gears (pinions) may mesh with an annular gear, such that rotation of the motors may be transmitted to the annular gear through said gearboxes and gears. This rotation of the annular gear may cause rotation of the rotational system.

Each electronic converter is a device adapted to receive torque and speed setpoints and to power its related motor in accordance with said torque and speed setpoints. Each drive which may be designated as master drive is adapted to obtain values representing the real torque and speed developed by its related motor, such that said real torque and speed may be provided to the central control system for calculations. Hence, taking this into account, as the electronic converters do not typically have powerful processing capabilities, the rotational system may be cheaper in comparison with other systems comprising more complex devices such as e.g. PLCs (Programmable Logic Controllers).

The values representing the real torque and speed of the motor of the master drive may be obtained by estimating or, alternatively, by measuring. Converters having functionalities for estimating the real torque and speed developed by its related motor are known. These converters may act as motor drivers in the context of the present invention. Estimation of the real torque and speed is normally performed by said converters from electric magnitudes powering the motor (e.g. electric currents provided by the converter to the motor) and mechanical features of the motor. Alternatively to estimating real torque and speed, sensors (integrated or not with the converter) for measuring said real torque and speed may be used. On one hand, converters with estimation of torque and speed are cheaper than having dedicated sensors to measure torque and speed. On other hand, said estimation by said converters produces torque and speed values of lower accuracy than the values provided by dedicated sensors. However, said estimation by said converters is considered to be accurate enough in the context of the present invention.

A speed setpoint is defined as a signal to be provided to an electronic converter indicating the speed to be developed by the related motor. A torque setpoint is defined as a signal to be provided to an electronic converter indicating the maximum torque to be developed by the related motor, said maximum torque value being mainly limited by mechanical constraints. Consequently, the real torque value (developed by the motor) will always be lower than said torque setpoint and dependent on operational conditions such as, e.g. wind speed. For particular speed and torque setpoints provided to an electronic converter, the real speed developed by the related motor is expected to be equal to the speed setpoint, while the real torque developed by the motor should be below the torque setpoint. However, the real torque developed by the motor may reach the torque setpoint for certain short periods.

Movement of a multi-motor rotational system in a wind turbine normally comprises detection of when said movement is needed, and generation of corresponding setpoints to cause individual movement of the motors for causing together the desired movement of the whole system. Generation of a setpoint may comprise detecting when the generation of said setpoint is required. In a movement operation, different strategies may be applied comprising generation of diverse setpoints of diverse amounts depending on e.g. the progress of the movement operation, wind conditions, etc. For example, setpoints of high amount may be generated at the beginning of the operation to accelerate the movement, whereas setpoints of low amount may be generated at the end of the operation to stop the movement.

In the proposed method, once necessity of new speed and torque setpoints has been detected, the corresponding master speed and torque setpoints are determined and sent to the master drive. This way, the electronic converter of the master drive starts to drive its related motor in accordance with said master speed and torque setpoints. Furthermore, each slave drive is provided with a slave speed setpoint based on the master speed setpoint. Also, each slave drive is provided with a continuously updated slave torque setpoint. To this end, a value representing the real torque developed by the motor of the master drive is continuously obtained, such that the provided slave torque setpoint is continuously updated with said value representing the real torque of the master motor.

Detection of when generation of new speed and torque setpoints is needed and determination of the corresponding master speed and torque setpoints may be performed in accordance with conventional methods aimed at this end.

Effects of the proposed method may be described as follows, in terms of a sequence of micro-stages.

In a first stage, the master drive receives (master) speed and torque setpoints different from zero, whereas each slave drive receives (slave) torque setpoint equal to zero and (slave) speed setpoint different from zero (based on the master speed setpoint). Therefore, only the master drive starts to generate torque and speed on its related motor.

In a second stage, the real torque of the master drive is rapidly increased because the master drive is the only drive generating torque to move the system. In turn, this real torque of the master drive is received by each slave drive as the slave torque setpoint, so that each slave drive starts to generate torque to move the system with a torque delay with respect to the master drive. At this stage, the system starts moving and the slave speed setpoint keeps its value depending on the master speed setpoint.

In a third stage, the real speed of the master drive reaches the master speed setpoint. At this moment, the real torque of the master drive is high and can eventually reach the master torque setpoint, although in most situations this maximum torque should not be reached. Each slave drive receives this high real torque of the master drive as the slave torque setpoint but with a certain torque delay with respect to the master drive. The necessary torque to move the overall system is being distributed in a balanced manner between all the motors of the system.

In some examples of the method, the slave speed setpoint may be equal for all of the slave drives.

In some examples, the slave speed setpoint may be, for all of the slave drives, equal to the master speed setpoint plus or minus a predetermined offset value.

In some embodiments of the invention, the method may further comprise determining, from the values representing the real speed and torque of the master drive, whether the motor of the master drive is acting as a motor or as a generator. In said embodiments, the slave speed setpoint may be equal to the master speed setpoint plus the predetermined offset value when the motor of the master drive is acting as a motor. And still in these embodiments, the slave speed setpoint may be equal to the master speed setpoint minus the predetermined offset value when the motor of the master drive is acting as a generator.

Effects of these last embodiments may be explained as a continuation of the previous example based on 3 microstages. This example takes into account that the master drive is acting as a motor.

In a fourth stage, the increasing slave torque setpoint (from the third stage) finally causes the slaves to reach the master speed setpoint. At this moment, as the slave speed setpoints are greater than the master speed setpoint (by a predetermined offset), the slaves try to move faster than the master, which causes the slaves to push the master. This way, part of the real torque developed by the master is distributed between the slaves. This distribution causes the master to decrease its real torque, which, in turn, is provided to each slave as the corresponding updated slave torque setpoint. The initial conditions of the third stage are thus achieved again, since the master starts to increase again its real torque to reach the master speed setpoint. Therefore, a repetitive loop of the third and fourth stages is caused, which provides equilibrium between all the motors, in which the speed of operation is dictated by the master and the motors share in a balanced manner the torque moving the overall system.

The motor of the master drive acts as a generator (or brake) when conditions external to the master drive (e.g. wind conditions, other motors of the system, etc.) cause an opposing torque which is, in absolute value, greater than the torque developed by the master motor. Actuation of the master motor as a generator occurs when the speed and torque developed by this motor have opposite signs, which places the motor operation in a generator quadrant of the relation between speed and torque. This is why, in this case (master motor acting as generator), the equilibrium between all the motors is achieved by subtracting (instead of adding) the predetermined offset from the master speed setpoint to obtain the corresponding slave speed setpoint.

Alternatively to the embodiments based on using a predetermined offset value, the slave speed setpoint may be equal to the master speed setpoint plus or minus a variable offset value. Particularly, in some embodiments, this variable offset value may be determined in accordance with a PID control based on a difference between the value representing the real speed of the master drive and the master speed setpoint.

A PID control comprises calculating an "error" value as the difference between a measured process variable (value representing real speed of the master drive) and a desired setpoint (master speed setpoint). The PID control attempts to minimize the calculated error value by adjusting the inputs. The repetitive loop of the third and fourth stages (of the previous example based on 4 micro-stages) comprises repeatedly increasing (third stage) and decreasing (fourth stage) the slave torque setpoints. This fluctuation of the slave torque setpoints may thus be minimized by using a PID control as described herein.

An advantage of this method may be that, since each motor is driven by its dedicated electronic converter, if one of these electronic converters fails, only its related motor may become inoperative and not the whole system.

Another advantage of this method may be that a balanced distribution of the torque to move the system may be achieved by using a simple and cheap system configuration. As the central control unit concentrates most of the logic (intelligence) of the method, and the electronic converters do not typically have powerful processing capabilities, the overall system may be significantly cheap.

A further advantage may be that coordination between all the drives is performed by the central control system, which facilitates the implementation of the method in comparison with distributed implementations. This simplicity of the implementation makes the implementation and its maintenance cheaper. Moreover, if designation of master/slave drives is dynamically performed by the central control system, the life of the motors can be extended in comparison with a predetermined designation or pre-designation.

In a second aspect, the invention provides a wind turbine rotational system comprising a plurality of drives and a central control system, each drive comprising a motor, an electronic converter for driving the motor and an actuator operatively connected with the motor, said wind turbine rotational system being adapted to perform any of the methods previously described.

In embodiments of the invention, the wind turbine rotational system may be a pitch system for pitching a blade or, alternatively, the wind turbine rotational system may be a yaw system.

According to some embodiments, a wind turbine is provided comprising a wind turbine rotational system as described before.

BRIEF DESCRIPTION OF THE DRAWINGS

Particular embodiments of the present invention will be described in the following by way of non-limiting examples, with reference to the appended drawings, in which.

DETAILED DESCRIPTION OF EMBODIMENTS OF THE INVENTION

In the following description, numerous specific details are set forth in order to provide a thorough understanding of the present invention. It will be understood by one skilled in the art however, that the present invention may be practiced without some or all of these specific details. In other instances, well known elements have not been described in detail in order not to unnecessarily obscure the description of the present invention.

Figure 1:
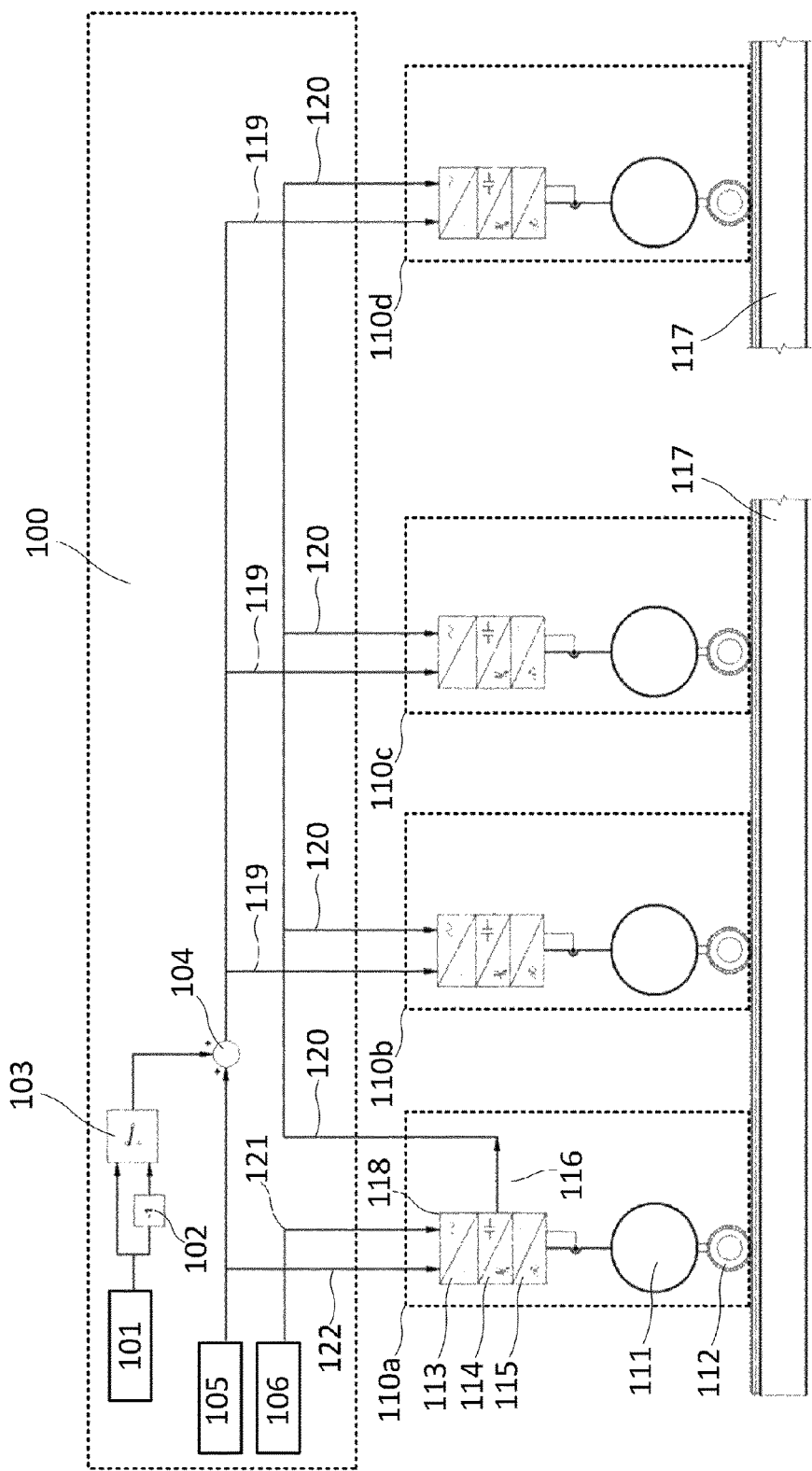
FIG. 1 schematically illustrates a wind turbine rotational system according to a first embodiment of the invention.

FIG. 1 schematically illustrates a wind turbine rotational system comprising a central control system 100, several drives 110a-110d, and an annular gear 117. The rotational system may be a yaw system or a pitch system. This figure shows four drives 110a-110d, but other numbers (greater than one) of drives are also possible, depending on the technical features of the system to be driven. A pitch system may normally require fewer drives than a yaw system.

Each drive 110a-110d comprises a motor 111, a converter 118 (which acts as a driver) for driving the motor 111 and an actuator 112 operatively connected with the motor 111. The actuator 112 may comprise e.g. a gearbox and a pinion, each of the pinions meshing with the annular gear 117. The movement produced by each motor 111 may thus be transmitted to the annular gear 117 through the corresponding gearbox and pinion 112. This configuration has the advantage of dividing the overall load for moving the rotational system into several motors 111, several pinions 112 and several portions of the annular gear 117. This may allow decreasing the load of the related motor 111 and may increase the durability of said pinions 112 and annular gear 117.

The central control system 100 of the rotational system may be integrated in the central control system of the wind turbine. In this case, just one control unit may be used to control the rotational system and to perform a centralized control of the overall wind turbine. Some modules and/or executable instructions of this single unit may be dedicated to control the rotational system whereas some other modules and/or executable instructions may be in charge of performing a centralized control of the wind turbine. For example, this single unit may be a PLC (Programmable Logic Controller) which may be programmed with a first set of executable instructions implementing functionalities for performing a centralized control of the wind turbine, and a second set of executable instructions implementing functionalities for controlling the rotational system. In alternative implementations, the central control system of the rotational system may be a unit separated from the central control system of the wind turbine.

The converters 118 may comprise the necessary elements for converting AC power from a power line (not shown) into DC power, and for finally converting said DC power into variable AC power, in accordance with the characteristics of the corresponding motors 111 and/or the power lines. For example, each converter 118 may comprise a rectifier 113, a DC link 114, and an inverter 115. In case of the power line being a DC power line, only conversion of DC power into variable AC power will be required (DC link 114, and inverter 115). As these kinds of converters 118 are generally well known in the technical field, no further detailed descriptions will be provided. In the particular examples illustrated here, the motors 111 are assumed to be AC motors. The invention however is not limited to this particular choice as other suitable motors may also be used.

Dissociation of torque and speed variables is used in embodiments of the operation method to be performed by the rotational system. Thus, application of either DC or AC or reluctance motors and corresponding equipment, such as e.g. suitable converters, allow dynamic adjustment of torque and speed. In this sense, for example, converters with vector control or DTC (Direct Torque Control) may be used for driving said AC motors.

Some protection systems (not shown) for the converters 118 and motors 111 may be provided. These protection systems may be based on means for interrupting or attenuating the electrical current/voltage, as for example fuses, on-off switches, push switches, and so on. These protection systems may be of particular relevance in situations of e.g. electrical surge, in which case the components of the system may be damaged. The central control system 100 may activate/deactivate these protection systems by sending corresponding on-off signals. As these kinds of elements are generally well known in the technical field, no further detailed description will be provided in this context.

For sake of simplicity, the first drive 110*a* is shown pre-designated as master drive, which means that this drive 110*a* will always act as master drive while the rest of the drives will act as slave drives. In alternative embodiments, however, designation of master and slave roles could be performed dynamically by the central control system 100, such that the role of master drive can be successively assumed by different drives.

The central control system 100 is shown comprising a module 105 for determining master speed setpoints and a module 106 for determining master torque setpoints. A connection 122 between the module 105 and the converter 118 of the master drive 110*a* permits the control system 100 to send each determined master speed setpoint to the converter 118 of the master drive 110*a*. A connection 121 between the module 106 and the converter 118 of the master drive 110*a* permits the control system 100 to send each determined master torque setpoint to the converter 118 of the master drive 110*a*.

The central control system 100 is shown further comprising a module 101 for providing a predetermined speed offset with positive sign, a module 102 for giving negative sign to this predetermined speed offset, a module 103 for selecting the predetermined speed offset with positive sign or with negative sign, and a module 104 to aggregate said positive or negative speed offset to each determined master speed setpoint (from the module 105). Suitable connections between said modules 101, 102, 103, 105 are shown to implement embodiments of the operation method to be performed by the rotational system.

Suitable connections 119 between the module 104 and the converter of each slave drive 110*b*-110*d* are also shown to permit the central control system 100 to send each output produced by the module 104 to the converter of each slave drive 110*b*-110*d*. The converter 118 of the master drive 110*a* is adapted to estimate (or measure) the real torque and speed developed by its related motor 111 and to produce corresponding outputs 116 representing said real torque and speed. Suitable connections 120 between the converter of the master drive 110*a* and the converter of each slave drive 110*b*-110*d* are provided to permit the control system 100 to send each estimated (or measured) real torque 116 developed by the motor 111 of the master drive 110*a* to the converter of each slave drive 110*b*-110*d*.

In the context of a movement operation performed by the rotational system, when generation of new torque and speed setpoints is detected as necessary, the control system 100 may generate the corresponding master torque and speed setpoints through the modules 105 and 106. Then, the control system 100 may send these generated master torque and speed setpoints to the converter 118 of the master drive 110*a* through the corresponding lines 121, 122. The control system 100 may also obtain, from the converter 118 of the master drive 110*a*, an estimation of the real torque and speed 116 developed by the motor 111 of the master drive 110*a*. These real torque and speed 116 from the master drive 110*a* may be used by the control system 100 to determine whether the motor 111 of the master drive 110*a* is acting as a motor or as a generator.

The control system 100 may also obtain a predetermined speed offset with positive sign from the module 101, and use the module 102 to attribute negative sign to the predetermined speed offset if the motor 111 of the master drive 110*a* is acting as generator. Then, the control system 100 may use the module 103 to select the predetermined speed offset with positive sign if the motor 111 of the master drive 110*a* is acting as motor, or the predetermined speed offset with negative sign if the motor 111 of the master drive 110*a* is acting as generator.

The control system 100 may obtain a corresponding slave speed setpoint by using the module 104 to aggregate the positive or negative speed offset (from module 103) to the master speed setpoint (from module 105). The control system 100 may also obtain a corresponding slave torque setpoint equal to the estimated (or measured) real torque 116 (from the converter 118 of the master drive 110a). The control system 100 may then send the obtained slave speed setpoint to the converter of each slave drive 110b-110d through the corresponding lines 119, and send the obtained slave torque setpoint to the converter of each slave drive 110b-110d through the corresponding lines 120.

Figure 2:
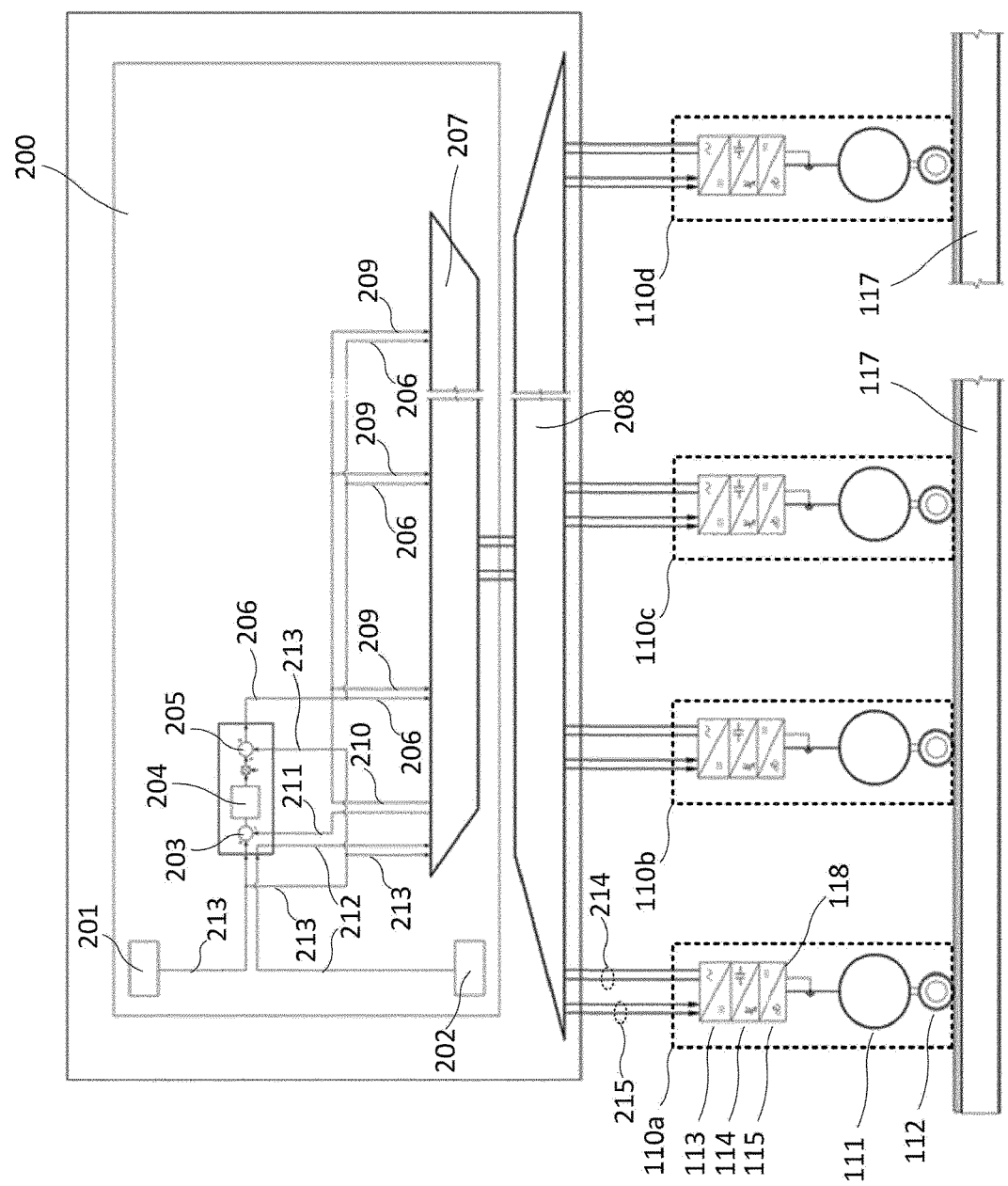
FIG. 2 schematically illustrates a wind turbine rotational system according to a second embodiment of the invention.

FIG. 2 schematically illustrates a wind turbine rotational system according to a second embodiment of the invention. As in the case of the system of FIG. 1, this rotational system also comprises two main parts: drives 110a-110d with a corresponding annular gear 117, and a central control system 200. This rotational system may be a yaw system or a pitch system. This figure shows four drives 110a-110d, but other numbers (greater than one) of drives are also possible, depending on the technical features of the system to be driven. A pitch system may normally require fewer drives than a yaw system.

The drives 110a-110d may be identical or similar to the drives shown for the system of FIG. 1. The connections 214,215 between the drives 110a-110d and the control system 200 are shown different with respect to FIG. 1. The control system 200 is also shown different from the control system 100 of FIG. 1.

The central control system 200 of the rotational system may be integrated in the central control system of the wind turbine or, alternatively, the central control system 200 of the rotational system may be a unit separated from the central control system of the wind turbine. All the principles commented in this respect with reference to FIG. 1 are also of application to the system illustrated by FIG. 2.

FIG. 2 shows a selector 208 acting as an interface between the control system 200 and the drives 110a-110d. Each drive 110a-110d has connections 214 for the drive 110a-110d sending estimated (or measured) real torque and speed to the control system 200, and connections 215 for the control system 200 sending master/slave torque and speed setpoints to the drives 110a-110d. The control system 200 is shown comprising another selector 207 which, in combination with the selector 208, permits serializing transmissions of signals between the control system 200 and the drives 110a-110d. This way, the number of connections (cables) between the control system 200 and the drives 110a-110d may be reduced. Cables of a rotational system may suffer torsions, which may finally damage the system. Thus, reducing the number of cables may reduce the risk of damages in the system.

The control system 200 may provide suitable control signals to both selectors 207, 208 to achieve said serialization of transmissions between the control system 200 and the drives 110a-110d. These control signals may be provided to the selectors 207, 208 depending on the role (master or slave) attributed to each of the drives 110a-110d. A dynamic designation of master/slave roles to the drives 110a-110d may thus be performed with the configuration illustrated by FIG. 2. Any alternative known configuration permitting such a serialization may also be used in a similar way.

In alternative embodiments, the system may comprise exclusive connections between each drive 110a-110d and the control system 200, in which case no elements for implementing serialization of transmissions would be used. An aspect of having exclusive connections for each of the drives 110a-110d is that a high number of cables may be required between the control system 200 and the drives 110a-110d. Another aspect of having exclusive connections for each of the drives 110a-110d is that the system may be more reliable and faster.

FIG. 2 shows the control system 200 comprising a module 201 for determining master speed setpoints, a module 202 for determining master torque setpoints, and a module 203 for calculating a difference between an estimated (or measured) real speed of the master drive and a master speed setpoint (from the module 201). The control system is shown further comprising a module 204 for performing a PID control from the output of the module 203 (difference between estimated real speed of the master drive and master speed setpoint), and a module 205 for aggregating (adding) the output of the module 204 (PID control) and the output of the module 201 (master speed setpoint).

The control system 200 comprises a connection 213 for the module 201 to provide each determined master speed setpoint to the module 203, to the module 205, and to the selector 207, and a connection 212 for the module 202 to provide each determined master torque setpoint to the selector 207. Suitable control signals provided to the selectors 207 and 208 may cause transmission of the received master speed and torque setpoints to the drive 110a-110d having the role of master drive.

The selector 208 may receive through the corresponding lines 214 the estimated (or measured) real speed and torque of the motor of the master drive. Suitable control signals provided to the selector 208 may cause the selector 207 to receive from the selector 208 the estimated real speed and torque of the master drive. The control system 200 comprises a connection 211 between the selector 207 and the module 203, such that suitable control signals provided to the selector 207 may cause the module 203 to receive the estimated real speed of the master drive from the selector 207.

The control system 200 is shown in FIG. 2 with the selector 207 having an auto-connection 209, 210, such that suitable control signals provided to the selector 207 may cause transmission of the received estimated real torque of the master drive 210 to corresponding input lines 209 (of the selector 207 itself) attributed to slave drives. Suitable control signals provided to the selectors 207 and 208 may cause provision to each drive designated as slave drive of the estimated real torque of the master drive 209 as the corresponding slave torque setpoint.

The control system 200 also comprises a connection 206 between the module 205 and the selector 207 for the module 205 to provide its output (aggregation of the master speed setpoint and the output of the PID control) to the selector 207. Suitable control signals provided to the selectors 207 and 208 may cause provision to each drive designated as slave drive of the output of the module 205 as the corresponding slave speed setpoint.

In the context of a movement operation performed by the rotational system of FIG. 2, when generation of new torque and speed setpoints is detected as necessary, the control system 200 may generate the corresponding master torque and speed setpoints through the modules 201 and 202. Then, the control system 200 may send these generated master torque and speed setpoints to the selector 207. Suitable control signals provided to the selectors 207 and 208 may cause provision of said master torque and speed setpoints to the converter 118 of the drive 110a-110d designated as master drive.

The control system 200 may also obtain, from the converter 118 of the drive 110a-110d designated as master drive, an estimation (or measurement) of the real torque and speed developed by the motor 111 of the drive 110a-110d designated as master drive. Suitable control signals provided to the selectors 207 and 208 may cause the selector 207 to receive said estimated (or measured) real torque and speed from the master drive.

The control system 200 may use the module 203 to obtain a difference between the master speed setpoint (from module 201) and the estimated real speed of the master drive (from selector 207). This obtained difference may be used as input for the module 204 to perform a PID control of said difference, and the output of said PID control may be aggregated to the master speed setpoint (from module 201) to obtain a corresponding slave speed setpoint. This obtained slave speed setpoint may be received by the selector 207 through the corresponding connections 206, and suitable control signals provided to the selectors 207 and 208 may cause transmission of the slave speed setpoint from the selector 207 to each drive 110a-110d designated as slave drive.

The selector 207 may use its auto-connection 209, 210 to provide the received estimated real torque of the master drive 210 to corresponding input lines 209 (of the selector 207 itself) attributed to slave drives, such that suitable control signals provided to the selectors 207 and 208 may cause provision to each drive 110a-110d designated as slave drive of the estimated real torque of the master drive 209 as the corresponding slave torque setpoint.

In the described embodiments, an alternative to estimate torque and speed values may be measuring torque and speed through corresponding sensors arranged to that end.

The described embodiments of the method allow achieving the effect which has been previously described in terms of a sequence of 4 micro-stages. As commented before, a repetitive loop of the third and fourth stages is finally caused, which provides equilibrium between all the motors, in which the speed of operation is dictated by the master drive and the motors share in a balanced manner the torque moving the overall system. As also argued before, this equilibrium between all the motors may be achieved by operating simple and cheap system configurations.

In the various embodiments proposed herein, the central control system 100 or 200 has been described in terms of modules and connections between them for the sake of clarity. In alternative examples, some of the described modules may be integrated in a single module. These modules and connections may be implemented physically. Nevertheless, in alternative implementations, the functionalities performed by said modules and connections may also be implemented logically by e.g. suitably programming a programmable control unit, such as e.g. a PLC (Programmable Logic Controller). A module may be defined as a piece of hardware and/or software implementing one or more functionalities.

Although only a number of particular embodiments and examples of the invention have been disclosed herein, it will be understood by those skilled in the art that other alternative embodiments and/or uses of the invention and obvious modifications and equivalents thereof are possible. Furthermore, the present invention covers all possible combinations of the particular embodiments described. Thus, the scope of the present invention should not be limited by particular embodiments, but should be determined only by a fair reading of the claims that follow.

The invention claimed is:

1. A method of operating a wind turbine yawn control or pitch control rotational system comprising a plurality of drives in the yaw control or the pitch control rotational system and a central control system, each drive comprising a motor, each motor in driving engagement through an actuator with a common annular gear, and an electronic converter for driving the motor and the actuator operatively connected with the motor, wherein the central control system sends speed setpoints and torque setpoints to the electronic converters and the electronic converters drive the motors in the yaw control or the pitch control rotational system in accordance with the received setpoints, the method comprising:
designating one of the drives in the yaw control or pitch control rotational system as a master drive and designating the other drives in the yaw control or pitch control rotational system as slave drives,
the central control system determining a master speed setpoint and a master torque setpoint,
the central control system sending the master speed setpoint and the master torque setpoint to the master drive in the yaw control or pitch control rotational system,
the central control system obtaining, from the master drive, values representing the real torque and speed of the motor of the master drive,
and the central control system sending a slave speed setpoint and a slave torque setpoint to each of the slave drives in the yaw control or pitch control rotational system, wherein the slave speed setpoint is based on the master speed setpoint, and wherein the slave torque setpoint is equal to the value representing the real torque of the master drive:
determining, from the values representing the real speed and torque of the master drive, whether the motor of the master drive is acting as a motor or as a generator and, wherein
the slave speed setpoint is equal to the master speed setpoint plus a predetermined offset value when the motor of the master drive is acting as a motor, and
the slave speed setpoint is equal to the master speed setpoint minus the predetermined offset value when the motor of the master drive is acting as a generator.

2. A method according to claim 1, wherein the slave speed setpoint is the same for all the slave drives.

3. A method according to claim 1, wherein the predetermined offset value is a variable offset value.

4. A method according to claim 3, wherein the variable offset value is determined in accordance with a PID control based on a difference between the value representing the real speed of the master drive and the master speed setpoint.

5. A wind turbine yaw control or pitch control rotational system comprising
a plurality of drives in the yaw control or pitch control rotational system and a central control system,
each drive comprising a motor,
each motor in driving engagement through an actuator with a common annular gear in the yaw control or the pitch control rotational system, an electronic converter for driving the motor and the actuator operatively connected with the motor, wherein in the yaw control or pitch control rotational system one of the drives is designated as a master drive and the other drives are designated as slave drives, The central control system configured for:

Determining a master speed setpoint and a master torque setpoint,

Sending the master speed setpoint and the master torque setpoint to the master drive in the yaw control or pitch control rotational system, Obtaining, from the master drive, values representing the real torque and speed of the motor of the master drive Sending a slave speed setpoint and a slave torque setpoint to each of the slave drives in the yaw control or pitch control rotational system, wherein the slave speed setpoint is based on the master speed setpoint, and wherein the slave torque setpoint is equal to the value representing the real torque of the master drive;

determining, from the values representing the real speed and torque of the master drive, whether the motor of the master drive is acting as a motor or as a generator and wherein the slave speed setpoint is equal to the master speed setpoint plus a predetermined offset value when the motor of the master drive is acting as a motor, and the slave speed setpoint is equal to the master speed setpoint minus the predetermined offset value when the motor of the master drive is acting as a generator.

6. A wind turbine rotational system according to claim 5, wherein the slave speed setpoint is the same for all the slave drives.

7. A wind turbine rotational system according to claim 5, wherein the predetermined offset value is a variable offset value.

8. A wind turbine rotational system according to claim 7, wherein the variable offset value is determined in accordance with a PHD control based on a difference between the value representing the real speed of the master drive and the master speed setpoint.

* * * * *